March 7, 1967

R. G. HOLMAN 3,308,000

TIRE TREAD WINDING MACHINE HAVING
A PUNCHED TAPE CONTROL SYSTEM

Filed Aug. 5, 1963

INVENTOR.
RUDOLPH G. HOLMAN
BY
Nicholas V Volk
ATTORNEY.

FIG. 8.

INVENTOR.
RUDOLPH G. HOLMAN
BY
Nicholas T Volak
ATTORNEY.

Fig. 9.

INVENTOR.
Rudolph G. Holman
BY
Nicholas T Vohr
ATTORNEY.

March 7, 1967  R. G. HOLMAN  3,308,000
TIRE TREAD WINDING MACHINE HAVING
A PUNCHED TAPE CONTROL SYSTEM
Filed Aug. 5, 1963  8 Sheets-Sheet 6

INVENTOR.
RUDOLPH G. HOLMAN
BY
Nicholas T. Vohs
ATTORNEY.

United States Patent Office 3,308,000
Patented Mar. 7, 1967

3,308,000
TIRE TREAD WINDING MACHINE HAVING A PUNCHED TAPE CONTROL SYSTEM
Rudolph G. Holman, Santa Ana, Calif., assignor to W. J. Voit Rubber Corp., a corporation of California
Filed Aug. 5, 1963, Ser. No. 299,947
7 Claims. (Cl. 156—397)

This invention relates to a machine for winding an elastomeric ribbon on the outer surface of a green casing in the course of its original manufacture or on a used, buffed pneumatic tire casing for retreading or recapping such casing.

It is an object of this invention to provide a programmer for a ribbon winding machine, which is used for winding an elastomeric ribbon on a tire casing, the programmer automatically controlling the operation of the machine with the aid of a punched tape, the positions of the perforations on the tape determining the path followed by the ribbon on the tire casing and the thickness of the variable thickness elastomeric layer deposited on the casing by winding the ribbon around the casing.

It is also an object of this invention to provide a machine of the above type which continuously rotates, or spins, the tire casing around its spin, or normal rotational axis, and simultaneously produces a relative transverse, or azimuth, movement between the casing and the elastomeric ribbon being wound on the casing, the azimuth movement being a start-stop movement, the magnitude of the azimuth movement during each spin revolution being controlled by the punched tape having a perforation for each spin revolution of the casing, the positions of the punched holes on the tape determining the amount of the azimuth movement during each spin revolution, and, in this manner, the pattern wound on the casing.

It is also an object of this invention to provide the machine of the above type in which the azimuth movement is produced by means of a fluid-operated actuator which makes the ribbon, being wound in the casing, follow a composite spiral having a zero pitch portion when there is no azimuth movement and a constant pitch for variable intervals of time and variable amounts of transverse azimuth movement when there is an azimuth movement, the azimuth movement starting at a fixed spin position of the casing and continuing for a fraction of the spin revolution, this fraction being determined by a programmer and the desired thickness of the variable thickness elastomeric layer to be deposited on the casing being determined solely by the amount of the azimuth movement during each spin revolution.

Referring to the drawings.

Before proceeding with the description of the machine and control systems, it would be helpful to describe what is accomplished by the machine. This is illustrated in FIGS. 15–19.

Figures 15, 16, 17, 18:
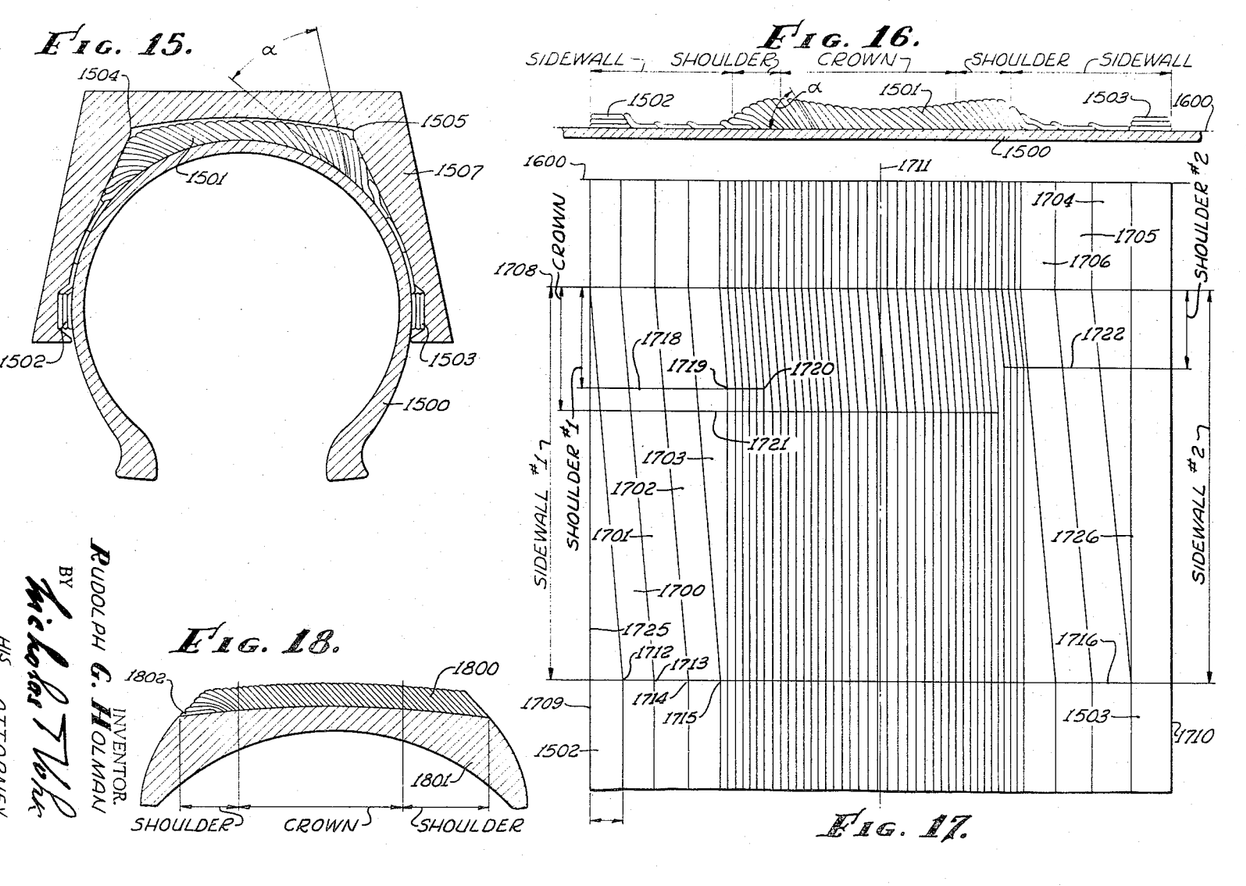
FIGURE 15 is a transverse sectional view of the upper half of a casing, variable thickness layer deposited on the casing in accordance with the disclosed method, surrounded by a tire mold.
FIGURE 16 is a transverse sectional view of the upper half of a casing and variable thickness layer deposited according to the disclosed method, with the casing developed, or unfolded, along a straight line.
FIGURE 17 is a plan view of a small portion of the variable thickness layer illustrated in FIGS. 15 and 16.
FIGURE 18 is a transverse section of still another version of the layer that may be deposited on a tire casing.

FIGURE 15 discloses a casing 1500 which has a variable thickness layer 1501 deposited on the casing. This layer also includes beauty rings 1502 and 1503. The deposited layer 1501 is thinnest along the sidewalls of the casing and is thickest at the shoulders, which correspond to corners 1504 and 1505 of a martix 1507 surrounding the casing. The matrix also includes the tread pattern which imbeds itself in conventional manner into the central portion of the variable thickness layer 1501. The tread pattern members of the matrix are not illustrated in FIG. 15.

The same pattern is also illustrated in FIG. 16 except that that portion of the casing on which the variable thickness layer is deposited now is presented along a straight line 1600, with the illustrated portion of the casing being again at 1500, the beauty rings at 1502 and 1503 and the remaining portion of the variable thickness layer 1501 being illustrated between the beauty rings 1502 and 1503.

As illustrated in FIGS. 15 and 16, the variable thickness layer is obtained by varying the degree of overlap between adjacent turns. The thicker portion of the layer is obtained by increasing the degree of overlap and the thinner portion of the layer being obtained by decreasing the degree of overlap. The degree of overlap is never made equal to zero since this may lead into a void in the elastomer in the course of final curing and, therefore, the minimum degree of overlap is in the order of 5%, and the maximum degree of overlap is equal to 100%, which takes place at the beauty rings 1502 and 1503. The 100% overlap means that the consecutive layers of the elastomeric ribbon used for depositing the layers are superimposed on top of each other, as illustrated at the beauty rings 1502 and 1503. The degree of inclination of the ribbon, with respect to the surface of the casing at the point of contact of the ribbon with the casing, should not exceed an angle of, say, 65°, so as to enable proper stitching of the ribbon to the casing. In the majority of the cases this maximum angle is in the order of 45° rather than 65°. This angle is illustrated in FIGS. 15 and 16 as angle α.

FIGURE 17 is a plan view of that section of the variable thickness layer which includes the azimuth movement. The illustrated system is a "start-stop" system, which means that there is a continuous spinning of a casing 26 or carcass, FIG. 1, around the spin axis 37, which is the normal rotation of casing 26 around spin axis 37 at the rate corresponding to the rate of extrusion of ribbon 20 by extruder 13. At the same time, in order to deposit a variable thickness layer, it is necessary to produce a relative transverse movement between ribbon 20 and casing 26 so as to obtain a variable degree of overlap between adjacent turns, and this is obtained by rotating casing 26, FIG. 1, around the azimuth axis 45 with the aid of the azimuth shaft 40, which is PERIODICALLY rotated by a hydraulic actuator 54. It is this rotation of casing 26 around the azimuth axis 45 that is referred to in this specification as an azimuth rotation, and it is this rotation that is the start-stop rotation. The programmer which controls the azimuth rotation is so arranged that the azimuth rotation always begins at a predetermined angular position of casing 26 and wheel 8, supporting the casing on the spin axis 37. The azimuth rotation then continues for a fraction of a spin revolution which fraction may be in the order of from 60° to 120°, and then such azimuth rotation is stopped while the spin rotation around the spin axis 37 continues all the time at the rate determined by the rate of extrusion of ribbon 20. It is the duration, or rather the amount, of the azimuth movement that determines the thickness of the deposited layer. When there is no azimuth movement whatsoever and there is only a spin rotation around axis 37, then the consecutive turns of ribbon 20 on casing 26 are superimposed on top of each other in the manner indicated at 1502 and 1503 in FIGS. 15 and 16. When the duration of the azimuth movement is maximum, which means that it persists through, say, 120° of the 360° spin revolution of casing 26 around spin shaft 37, then, as mentioned previously, there is a minimum of overlap, and such minimum is in the order of 5% of the total width of ribbon 20 for each spin revolution.

In the disclosed programmer the control of the amount of the azimuth movement, which will be described more in detail later, is obtained by means of a spin switch 38 mounted on an azimuth column 44, FIG. 1, and a spin switch cam 38a mounted on a wheel 8 which actuates spin switch 38. The spin switch 38 generates one set of electrical signals which starts the azimuth rotation during each spin revolution. Since the spin switch 38 is mounted on the azimuth column 44 which supports the spin axle 37, which cam 38a is mounted on wheel 8, it follows that spin switch 38 will be actuated and will generate the first set of electrical signals at a predetermined angular position of wheel 8 and casing 26; therefore, the azimuth movement will always begin at a predetermined angular position of wheel 8 and casing 26. It now is only necessary for the programmer to control the amount of the azimuth displacement so as to make this amount smaller when it is desired to have a thick portion of the layer 1501, and make this amount larger when it is desired to deposit only a thin layer of elastomer on the casing. Accordingly, the thickness of the deposited layer is a function of the magnitude of the azimuth rotation, and this lateral displacement per each spin revolution is controlled by means of a perforated tape 75, FIGS. 1, 2, 3 and 10, which is moved by the azimuth column 44, and the perforations on the tape are positioned so as to control the amount of the azimuth movement during each spin revolution.

All of the above is illustrated in a diagrammatic form in FIG. 17. At 1502 and 1503 there are two beauty rings which correspond to the similarly numbered beauty ring in FIGS. 15 and 16. The two visible outer edges 1725 and 1726 are parallel to the longitudinal center line 1711 because during the winding of the beauty rings there is no azimuth movement at any time. The slanting turns 1700, 1701, 1702, 1703, 1704, 1705 and 1706 correspond to the sidewall turns where there is a maximum transverse displacement of the ribbon in azimuth. The azimuth movement is obtained by means of a hydraulic actuator 54, FIG. 1, and the hydraulic actuator 54 turns the casing 26 and wheel 8 by means of belt 55 and pulleys 43 and 69 at a substantially uniform angular velocity. The overall program system and the method of operation is also predicated on the fact that the rate of extrusion of ribbon 20 is obtained at substantially constant rate of extrusion, and that also the spin speed, or the rotation, of casing 26 is electronically controlled so as to make it continuously equal to the rate of extrusion of ribbon 20. If there are any variations in the rate of extrusion, such variations in the speed of extrusion are considered to be of minor nature which can be tolerated insofar the effects of such changes in the speed of extrusion may have on the thickness of the deposited layer. In my prior applications disclosing more elaborate control systems the speed of the azimuth rotation is also controlled by the rate of extrusion of ribbon 20; however, it has been discovered through actual use of the machines of this type that simpler versions of the machines are also feasible where such control of the azimuth rotation can be avoided, thus simplifying the control system.

In the disclosed machine and control system, an additional control has been eliminated as compared to the earlier, more complex machines disclosed in my earlier applications, and that is the control of the azimuth rotation as a function of the thickness of the extruded ribbon 20. These variations in the thickness of ribbon 20, as a rule, also are of minor nature and can be disregarded in the simpler version of the machines, which is the machine disclosed in this application. A meter 120, FIG. 1, connected to a transducer 122, is provided for continually indicating the thickness of the ribbon and it is up to the operator to adjust the opening of a die 16 by means of a set-screw 121 so as to maintain the thickness of ribbon 20 reasonably constant.

Referring once more to FIG. 17, the azimuth movement begins at an imaginary transverse line 1708 which corresponds to the instant of closing of the spin switch 38 by cam 38a. It is then that the azimuth movement begins and it then continues for different lengths of time to produce different transverse displacement of the ribbon in different portions of the winding so as to deposit the variable thickness layer. At the beauty rings 1502 and 1503 there is no azimuth movement and no azimuth displacement whatsoever, and, therefore, lines 1709 and 1710 are parallel to the longitudinal axis 1711 of the winding. At the sidewalls where the degree of overlap is is in the order of 5%, the duration of the azimuth movement is longer than anywhere else and, therefore, points 1712, 1713, 1714, 1715, etc. are further removed from line 1708 than any other points, indicating the stoppage of the azimuth movement. For simplifying this description, the cessation of the azimuth rotation at the sidewall sectors is indicated by a transverse line 1716 which indicates that the azimuth movement is discontinued precisely at identical points, or identical intervals of time, as the casing is spun around spin axis 37. This need not necessarily be the case since, as will be explained more in detail later, perforations, such as perforations 76–79 on tape 75, FIG. 10, may be spaced, and generally are so spaced, that points 1712–1715, etc., are not located on a single transverse straight line 1716 perpendicular to the longitudinal axis 1711. Such displacement of the points means that there is a gradual blending of a smaller thickness into the greater thickness, and vice versa. The maximum thickness of the layer occurs at the shoulders; the intermediate thickness at the crown and the minimum thickness at the sidewalls. The division of the casing into the sidewall, shoulder and crown sectors is indicated in FIG. 16 by the dimensional lines and the appropriate legends.

Since the thickness of the layer is maximum at the two shoulders, it follows that the duration of the azimuth movement is the shortest in this portion of the winding, and this is indicated by a line 1718 which passes through points 1719–1720, indicating the instant where the azimuth movement ceases and the lines indicating the edges of the ribbon again are parallel to the longitudinal axis 1711 of the winding. For the crown the azimuth movement ceases at line 1721; for the second shoulder the azimuth movement ceases at line 1722; and for the second sidewall the azimuth movement ceases again at line 1716.

Again, according to FIG. 17, the transverse lines 1716, 1718, 1721 and 1722 indicate that the azimuth movement ceases precisely at identical points in the respective sectors, such as sidewall, shoulder, crown, etc. As already stated earlier, in actual practice this is not the case so as to obtain a better and more gradual blending of one layer into the other, and this is indicated by the perforations 76 . . . 79 on tape 75 in FIG. 10, which correspond to the actual positions of such perforations for an 8:00 x 14 tire casing and a 5080–15 Lodi matrix. The positioning of the perforations on tape 75 is obtained by empirical methods.

FIGURE 18 illustrates by the way of example an additional type of winding that can be obtained with the aid of the disclosed programmer and method. A substantilly uniform thickness layer 1800 is deposited on a casing 1801. Such layer is restricted only to the tread portion of the tire, and, therefore, it requires only two shoulders and a crown as indicated in FIG. 18. Such layer corresponds to the so-called "recap" layer which is often used for recapping truck tires.

Figure 19:
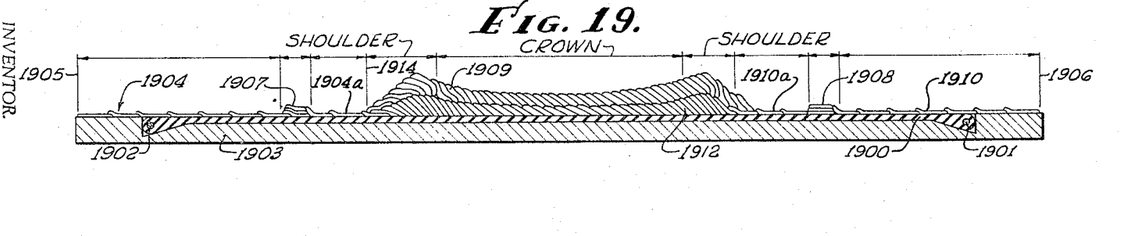
FIGURE 19 is a transverse sectional view of the upper half of a variable thickness layer which may be deposited according to the disclosed method on a green casing in the course of the manufacture of a new, pneumatic tire.

In FIG. 19 still another type of layer is illustrated which can be also deposited with the aid of the disclosed method. A layer of this type type will be suitable for depositing a variable thickness elastomeric layer in the course of the manufacture of new tires. A casing 1900 having beads 1901 and 1902 is mounted on a collapsible drum 1903. A first variable thickness layer 1904 extends from line 1905 to line 1906 and it includes two sidewall portions, or sectors, two beauty rings 1907 and 1908, two shoulder sectors and the central crown. Quite often it is desirable to deposit a different layer of rubber, having a different composition, on top of the first layer, and such layer is illustrated at 1909 in FIG. 19. The method of producing such a composite layer will be discussed later upon the conclusion of the description of the two types of programmers disclosed in this specification.

Figure 1:
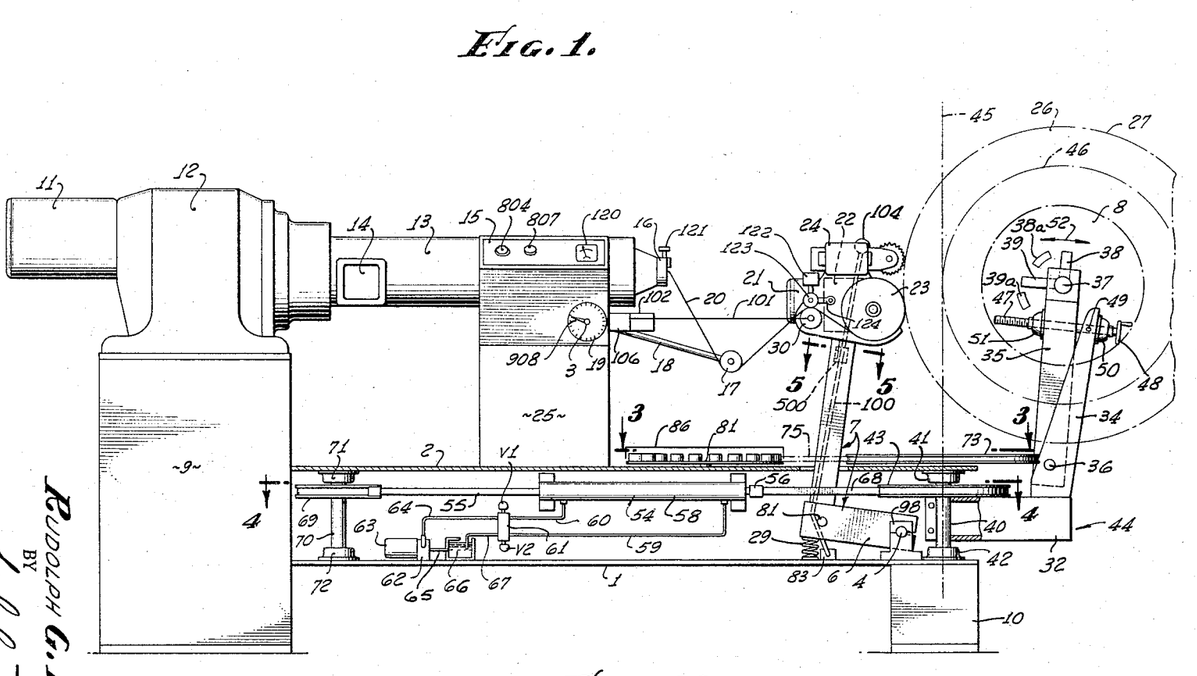
FIGURE 1 is a side view of the machine.
Figure 2:
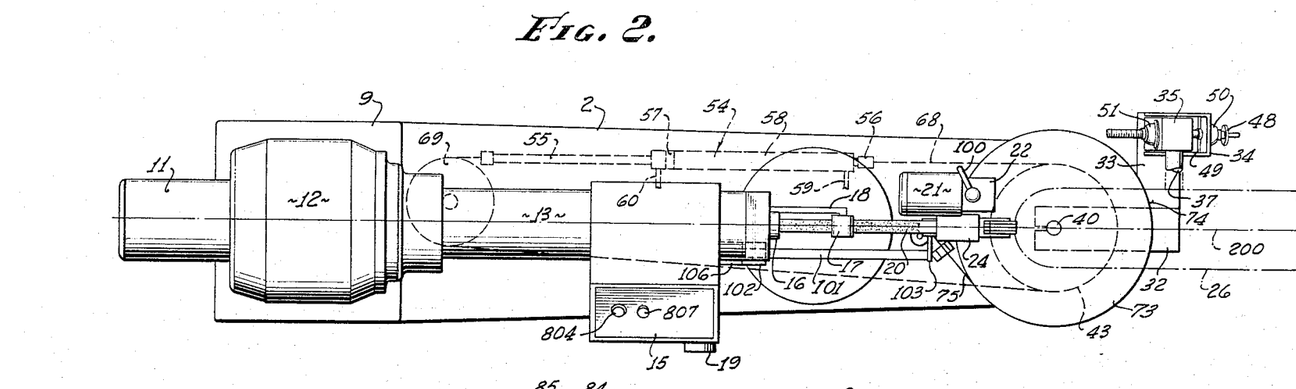
FIGURE 2 is a plan view of the machine.
Figure 3:
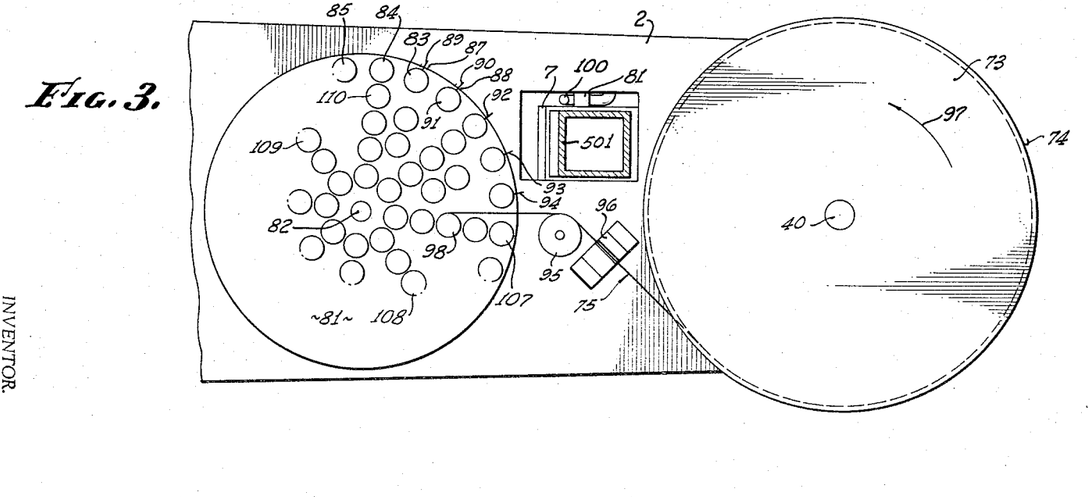
FIGURE 3 is a plan view, taken in the direction of arrows 3—3, FIG. 1, of that portion of the machine which includes a tape magazine and a tape-pulling disc.
Figure 4:
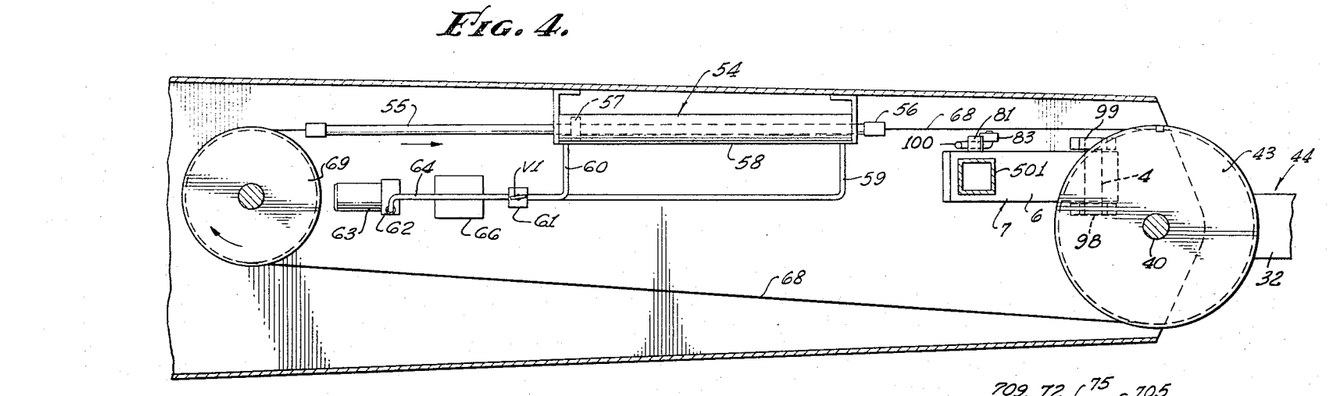
FIGURE 4 is a plan view, taken in the direction of arrows 4—4, FIG. 1, of a hydraulic azimuth drive for an azimuth column.
Figure 5:
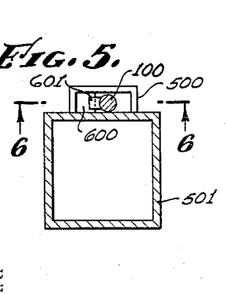
FIGURE 5 is a cross-sectional view of the stitcher and spin motor column taken in a plane 5—5 illustrated in FIG. 1.
Figure 6:
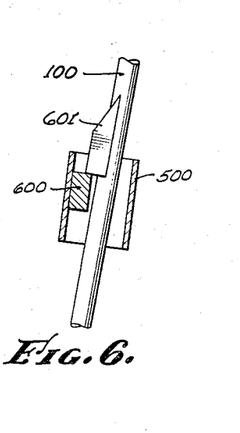
FIGURE 6 is a side view, partly in section, of a latch bar taken in a plane 6—6 illustrated in FIG. 5.

Referring to the drawings, and particularly to FIG. 1, the machine is mounted on two pedestals 9 and 10 and frame members 1 and 2. An extruder motor 11 is connected to a gear box 12, which in turn is connected to an extruder 13, having a side opening 14 for feeding raw elastomeric stock into the extruder. A control panel 15 is mounted on a pedestal 25. The extruder terminates in an extruder die 16, provided with a screw 121 for manually adjusting the thickness of the ribbon, which produces an elastometic ribbon 20 wound in a predetermined manner on a rotating casing 26. The thickness of ribbon 20 is indicated on meter 120 which is connected to and is operated by a transducer 122. Transducer 122 is operated by a roller 123 which rides on top of ribbon 20 and idler roller 30. Roller 123 is supported by a pivoted arm 124. Casing 26 is rotated by means of a spin motor 21 connected to spin wheel 23 through a gear box 22 when the machine is in operation. Spin wheel 23 engages the outer perisphery 27 of a penumatic tire casing 26 in the manner illustrated in FIG. 1 and is pressed against casing 26 by means of a coil compression spring 29 connected to a stitcher arm 7. The stitcher arm 7 includes a horizontal member 6 and a vertical member 5 comprising an L-shaped support for a stitcher 24, motor 21, idler roller 30 and spin wheel 23. The stitcher arm 7 is connected to a rotatable shaft 4 mounted in two hubs 98 and 99. A lock bar 100 is used for locking the stitcher column 7 in its neutral position, which is the position when the stitcher 24 and the spin wheel 23 are swung away from hub 8 and casing 26. In this neutral position spin wheel 23 is removed from casing 26 and casing 26 is at a standstill. The locking bar 100 engages, with its lower portion, a roller 81 rotatively mounted on the horizontal member 6 of arm 7. The lower end of bar 100 is rotatively connected to a frame member 1 by means of a bracket 83, while its upper end is free to slide up and down in a guide frame 602, FIG. 6, fastened to arm 501. Column 7 is swung to the neutral position manually, against the forward pressure of the compression spring 29, by means of a handle 104 which is on top of a shaft rod 100 until the shaft rod 100 engages a latch 600 with a tooth 601, FIG. 6, in the manner shown in FIG. 6. Tooth 601 is welded to rod 100 and latch 600 is welded to the box 602 which in turn is welded to arm 501. When the machine is in operation, latch 600 and tooth 601 are released from engagement and column 7 is allowed to rotate forward, toward casing 26 because of the pressure of spring 29 until the spin wheel 23 and stitcher 24 engage casing 26. Spring 29 is sufficiently strong to exert the necessary strong pressure on the spin wheel 23 and stitcher 24 for obtaining positive engagement between the casing and the spin wheel 23 and sufficiently high pressure between the stitcher and the casing.

The ribbon wound on casing 26 is stitched to the casing by a stitcher 24 which is pressed against casing 26 by the compression spring 29 and individual springs in stitcher 24 which has a plurality of individual rollers mounted side-by-side with respect to each other. The loop formed by ribbon 20 between the extruder die 16 and an idler roller 30 is used to support an idler roller 17. The idler roller 17 is mounted on an arm 18 which is pivoted by means of a pivot 3 of a potentiometer 19. Potentiometer 19 is used for controlling the speed of the spin motor 21 so as to make the speed of casing 26, at the point of contact between stitcher 24 and casing 26, equal to the rate of extrusion of ribbon 20 by extruder 13. The electronic speed control system for the spin motor 21 will be described later in connection with the description of FIG. 9.

The tire casing is supported by means of an azimuth column having two horizontal arms 32 and 33, a fixed vertical arm 34 and an adjustable pivoted arm 35 pivoted on a pivot 36 and having a horizontal axle or spin axis 37 supporting an expandable hub 8 which is rotatably mounted on axil 37. Also mounted on arm 35 are two stationary spin switches 38 and 39 which are actuated by cams 38a and 39a mounted on hub 8. The armatures of the spin switches 38 and 39 make contact during each revolution of hub 8 and casing 26. The operation of the spin switches will be described later with the description of FIG. 8. The azimuth column 44 is supported on a rotatable azimuth shaft 40 which is rotably mounted on the frame members 1 and 2, with the aid of bearings 41 and 42. A pulley 43 is keyed to the azimuth shaft 40 and is used for rotating the azimuth shaft 40. Shaft 40 rotates the azimuth arm 44 and casing 26 around the vertical azimuth axis 45, passing substantially through the geometric center of the transverse section of casing 26 and being also tangent to the circular axis 46 passing through the geometric centers of the toroid formed by casing 26. The position of casing 26 is adjusted to the above position with respect to the vertical axis 45, until it becomes tangent to the circular axis 46, by means of a screw 47 which is operated by means of a manually rotated wheel 48 connected to the outer end of screw 47. Screw 47 is pivotally mounted by means of a pivoted yoke 50 which is connected to the fixed vertical column 34 by means of a pivot 49 and is connected to the pivoted azimuth arm 35 by means of a pivoted and threaded yoke 51 pivotally connected to the azimuth arm 35. In this manner the pivoted azimuth arm 35 can be rotated clockwise or counterclockwise, indicated by a double arrow 52, until circular axis 46 of the toroid formed by casing 26 is tangent to the vertical axis 45. A tape 101, mounted on the cabinet 25 in a tape holder 102, is used to measure the distance between cabinet 25 and a pointer 103 supported by the pivot of idler roller 30 with the stitcher column being in the position illustrated in FIG. 1. The tape is calibrated directly in winding radius required by different tire sizes. In this manner casing 26 is positioned in the right azimuth position with respect to the azimuth shaft 40. It is necessary to position casing 26 very carefully in proper azimuth radius position in order to produce proper pattern or shape of the variable thickness elastomeric layer to be deposited on the outer surface 27 of casing 26. This layer and its shape, and especially thickness, are influenced very markedly by the azimuth radius.

Azimuth shaft 40 is rotated by means of a belt 55 connected to the outer ends of the push rods 55 and 56 of a hydraulic actuator 54 and wrapped around pulley 43 and a pulley 69. Pulley 69 is keyed to shaft 70, mounted in bearings 71 and 72. Push rods 55 and 56 are connected to a piston 57 traveling in a cylinder 58 of actuator 54. High pressure flexible hoses 59 and 60 are connected to cylinder 58 of the actuator and these hoses, in turn, are connected to the solenoid operated four-way valve 61. Valve 61 is connected to a pump 62 operated by an electric motor 63. A high pressure line 64 connects the high pressure side of pump 62 to the four-way valve 61 and a low pressure line 65 connects the input side of pump 62 to a reservoir 66. Reservoir 66 is also connected through a low pressure line 67 to the four-way valve 61. The actuation of valve 61 by the solenoid coils V1 and V2 into one position or the other moves piston 57 in cylinder 58 in either of the two directions, depending upon the connections established by the four-way valve. In this manner the azimuth shaft 40 is rotated by the actuator 58 either in one direction or the other. The advantage of the above type of drive resides in its simplicity, reliability and ability to rotate the azimuth shaft 40 either automatically, with the aid of the actuator 54, or manually, in either direction, which cannot be done conveniently if shaft 40 were to be coupled by means of gears to an electric motor.

Azimuth shaft 40 also includes a disc 73 keyed to shaft 40 and, rotatable with shaft 40. Disc 73 is provided with a hook 74 which is used for connecting a control tape 75 to disc 73 in the manner illustrated on an enlarged scale in FIG. 3. The face view of tape 75 is illustrated on a still further enlarged scale in FIG. 10. Tape 75 has two scales on its face, each scale beginning from a "0" position with one scale running from "0" position to the left and the second scale running from "0" position to the right, as viewed in FIG. 9. The scales are used for positioning perforations 76, 77, 78, etc., along the length of the two scales, the "0" position on the scale indicating that position on the tire which coincides with the vertical plane passing through the longitudinal axis 200 of the machine. This longitudinal axis passes through the center of the azimuth shaft 40 and through the center of die 16, extruder 13 and the vertical plane bisects casing 26 when casing 26 lies or is turned so as to lie in this vertical plane. Tape 75 also has one additional perforation 80 which is located along the lower portion of the tape as viewed in FIG. 10. Perforation 80, which is located beyond and below perforation 79, is used for stopping the operation of the machine at the end of the cycle in a manner which will be explained later on in connection with the description of FIGS. 7, 8 and 10–13. A large number of tapes, such as tape 75, and tape holders 83, 84, 85, 91, 98, 107, 108, 109, 110, etc., are mounted on top of a rotatable disc 81 in the manner illustrated in FIG. 3, disc 81 being rotatably mounted on a shaft 82. Shaft 82 is supported by the upper frame member 2. The tapes are housed in individual tape holders 83, 84, 85, 91, 107, etc., which are provided with conventional centrally mounted springs for holding the tapes under tension within the housings. The end of the tapes, having appropriate tabs, project from a cover 86 mounted on top of disc 81. Cover 86 has a plurality of slits, such as slits 87, 88, etc., through which the free ends of tapes 89, 90, etc., pass. The coil springs in tape holders 83 and 91 normally hold the tapes 89, 90, etc., in a retracted position wound around the central stem within the housing in the manner well known to the art. Different tapes have different perforations of the type illustrated in FIG. 10 and these perforations determine the type of pattern wound on the tire casings. Since there are many tire sizes and many types of patterns and many variations in the thickness and the total width of the elastomeric layer to be wound on the casing, it becomes necessary to have a large number of tapes for depositing a large number of different layers on the large number of different tire casings. It is for this reason that a very large number of individual tapes is mounted on top of disc 81. The projecting tabs 89, 90, 92, 93, 94, etc., have information appearing directly on these tabs indicating the size of the casing and the type of the variable thickness layer that would be produced on a given size casing if any given tape is used for controlling the operation of the machine. In this manner, the machine can be used very readily for retreading or recapping or, in general, depositing a variable thickness elastomeric layer on an old buffed tire casing for retreading, or on a new, green tire casing for providing it with the elastomeric layer which surrounds the beads, the sidewalls, the shoulders and the crown of the casing. Upon selecting the proper tape, the operator threads the tape over an idler roller 95, through a tape reader 96 and then hooks the tab of the tape, such as 75, onto a hook 74 mounted on disc 73. After the operation of the machine is started, the azimuth shaft 40 then is rotated by means of the actuator 54, which rotates disc 73 in the direction of an arrow 97, as viewed in FIG. 3. Tape 75 in this manner is pulled out of its holder 98 against the counter force exerted by the spring in the tape holder, and the perforations on tape 75 control the operation of the machine in the manner which will be described presently.

Figure 7:
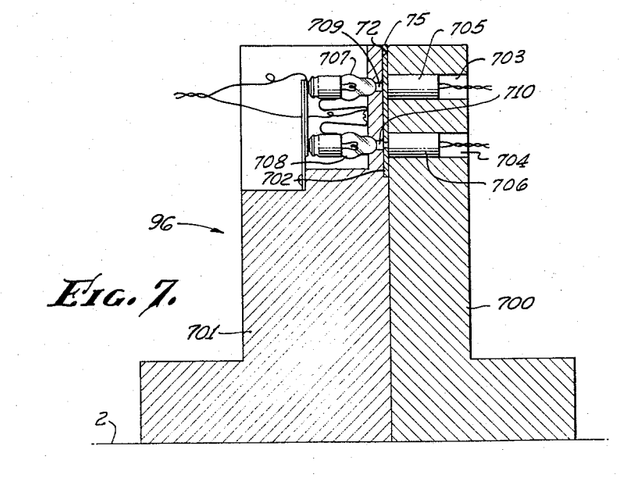
FIGURE 7 is a vertical section of a photo-electric cell tape reader.
Figure 8:
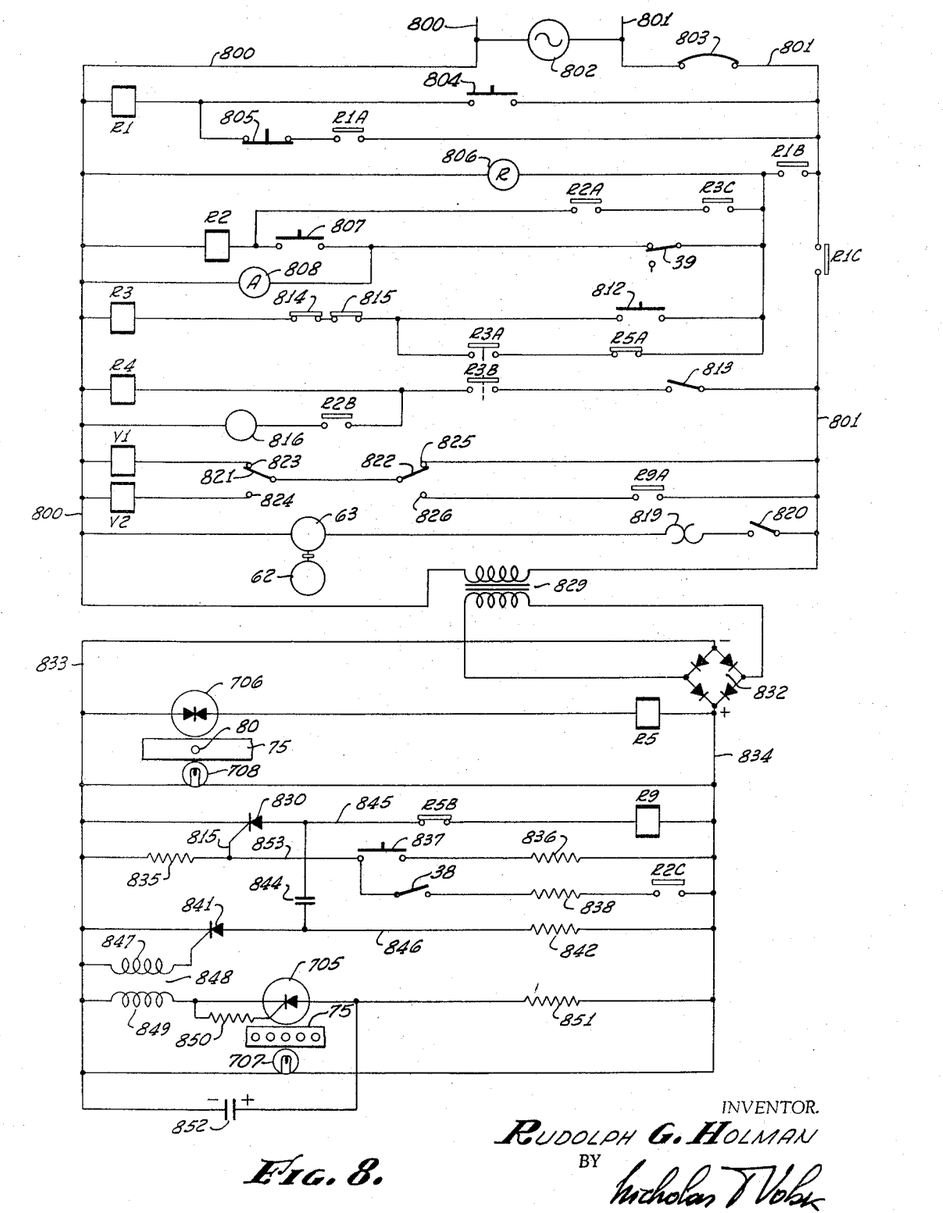
FIGURE 8 is a schematic diagram of the programmer for controlling the operation of the machine.
Figure 11:
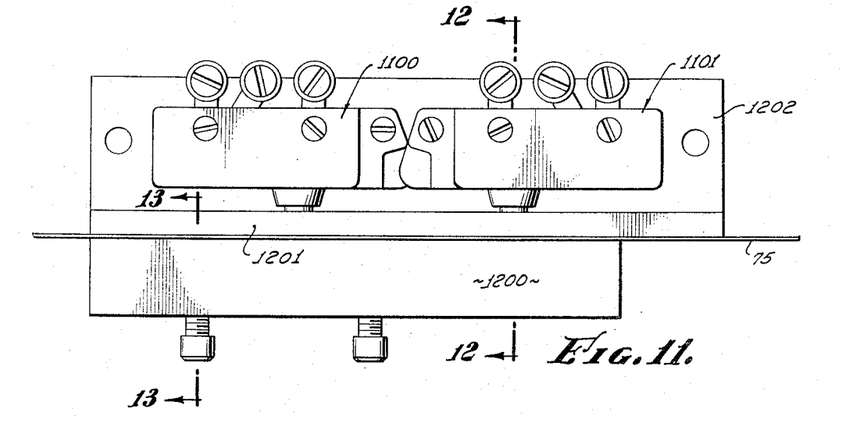
FIGURE 11 is a plan view of an alternative form of a tape reader using two microswitches.
Figure 12:
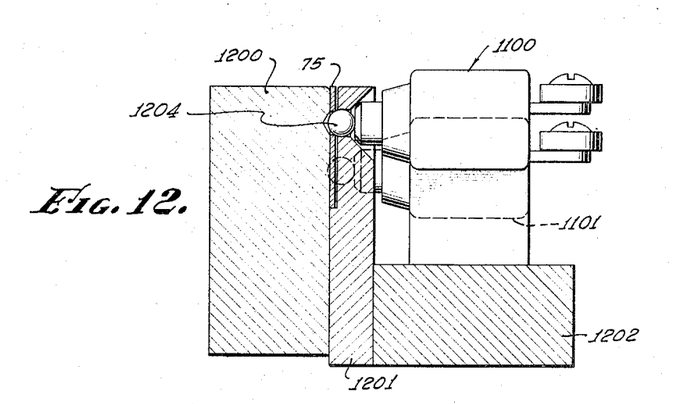
FIGURE 12 is a transverse section of the tape reader taken in a plane 11—11 shown in FIG. 10.
Figure 14:
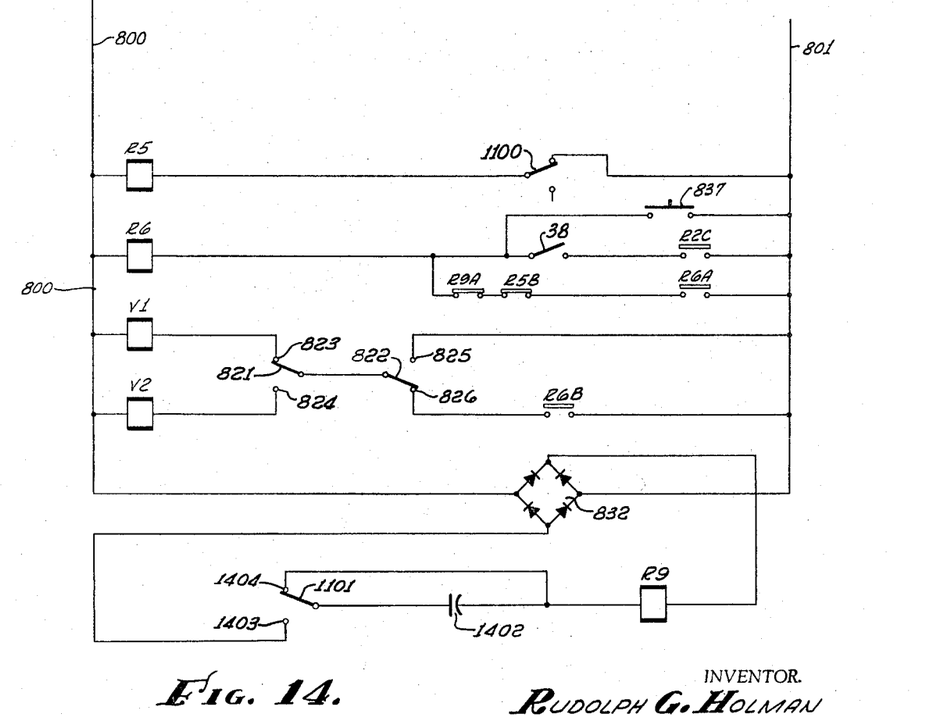
FIGURE 14 is a schematic diagram of the alternative form of the programmer for automatically operating the machine, including the tape reader of FIGS. 10 and 11.

Two types of tape readers are illustrated. FIGS. 7 and 8 illustrate a photo-electric tape reader, while FIGS. 11, 12 and 14 illustrate the tape reader which uses two micro-switches 1100 and 1101 for reading the tape. The photo-electric tape reader will be described first and it then will be followed with the description of the tape reader using micro-switches.

Referring to FIG. 7, the tape reader 96 comprises two metallic blocks 700 and 701. Block 701 is provided with a recess 702 whereby tape 75 can slide in slot 72 between blocks 701 and 700. Block 700 is provided with two circular openings 703 and 704, which are used for mounting two light sensitive elements 705 and 706 adjacent to tape 75. On the other side of this tape 75 there are two sources of light 707 and 708 which are used for actuating the photoelectric cells 705 and 706. Orifices 709 and 710 are provided in block 701 to admit light to the photo elements 705 and 706.

Referring now to FIG. 8, it discloses the programmer for automatically operating the machine, including the two photo-electric cell elements 705 and 706 for reading the tape 75 and lights 708 and 707. Busses 800 and 801 are connected to a source of alternating current 802 through a circuit breaker 803. A "power on" relay R1 is connected in series with a push button 804 which is located on panel 15, FIG. 1, and marked "Power On." This is the manually operated push button which connects power to the programmer after relay R1 becomes energized. Relay R1, when energized, closes three contacts R1A, R1B and R1C. Contacts R1A close the holding circuit through a "stop" push button 805 which is located on panel 15. Push button 805 is used for disconnecting power from busses 800 and 801 when complete shut down is desired. Upon energization of relay R1, red light 806 is energized, which indicates that the power is "on."

Relays R3 and R4 are two extruder relays used for starting extruder motor 11, FIG. 1. Relay R3 is the extruder pilot relay and relay R4 is the extruder power relay. The pilot relay R3 is connected in series with the normally closed contacts 814, 815, push button 812 and contacts R1B. Contacts R3A are relay locking contacts which are connected with the normally closed contacts R5A, which are the only contacts of relay R5. The circuit of relay R5 will be described later. Suffice it to say at this time that relay R5 is the program stopping relay which, when energized, opens contacts R5A, thus de-energizing relays R3 and R2, thus stopping the entire operation of the entire machine even though relay R1 still remains energized. The pilot relay R3 is energized by manually operating the push button 812. There are also two normally closed contacts 814 and 815 in series with relay R3 which are two overload contacts energized by the overload protecting relays connected in series with the power circuit of the extruder motor, not illustrated in FIG. 8. Relay R4 is connected with the normally open contacts R3B and a manually operated switch 813. Contacts R3B, upon closing, energize relay R4, provided the manually operated switch 814 is now in a closed position. As elapsed time indicator 816 is also connected in shunt with relay R4 and becomes energized when the circuit of relay R4 becomes closed. Elapsed time indicator 816 is merely a synchronous clock which indicates the total length of time the machine has been in operation. It is used as a metering device in case the machine is leased, rather than sold outright, to the users of this machine and it becomes necessary to measure and record the total, cumulative length of time the extruder, and, in this manner, the machine, has been in operation.

Before describing the circuit of relay R2, it should be mentioned here that the tire casing 26, FIG. 1, should be placed in the proper starting "azimuth" and "spin" positions.

The proper spin position is obtained by manually rotating casing 26 around its spin axis 37 until the spin switch 39 becomes closed. This takes place when cam 39a is turned until cam 39a is in line with switch 39, thus closing the switch. This at once energizes the amber light 808 indicating to the operator that he has placed casing 26 in the proper spin position. Such placing of casing 26 into the starting spin position also prepares the relay R2 circuit for the energization of relay R2 upon closing of the manually operated push button 807, which is the push button used for energizing the entire programmer. Push button 807 is also located on panel 15 of the machine. When this push button is depressed, the circuit of relay R2 becomes closed through the spin switch 39 and then a holding circuit for this relay is immediately established through the now closed contacts R2A, R3C and R1B. The fact that contacts R3C are closed means that the extruder relay R3 now is in the closed position, which also means that the extruder is normally in operation at the time relay R2 is energized and the entire programmer is in operation unless the manually operated switch 814 is opened by the operator. The purpose of the manually operated switch 814 is to give the operator an ability to operate the programmer without the operation of the extruder if such operation of the programmer is necessary for checking its proper functioning.

The programmer, therefore, is so arranged that either the extruder or the programmer can be operated simply whenever it is required to check or adjust their operation.

The only remaining circuits that are connected to busses 800 and 801 are the circuit of the hydraulic pump motor 63 which is connected in series with an overload protective device 819 and a manually operated switch 820. Motor 63 is connected to the hydraulic pump 62. Motor 63 and pump 62 have been described already in connection with the description of FIG. 1, and, as has been stated previously, pump 62 supplies pressure to the hydraulic fluid which is used for operating actuator 54. This is the actuator which produces the azimuth rotation of the azimuth shaft 40, azimuth column 44 and casing 26.

The last circuit to be described, which is also connected to the A.C. busses 800 and 801, includes the two solenoid operated valves V1 and V2 which are the two valves determining the position and operation of the four-way valve 61, which, as may be remembered from the description of FIG. 1, is connected in series with pump 62, actuator 54 and lines 59 and 60. Energization of valve V1 produces the azimuth rotation of the azimuth shaft 41 in one direction and energization of valve V2 reverses the direction of this rotation. In series with these valves, there are also connected the two manually operated toggle switches 821 and 822. The position of the manually operated switch 821 determines whether the solenoid operated valve V1 or V2 is operated at any given time. When switch 821 is on its upper contact 823, the solenoid operated valve V1 is energized, and when it is on its contact 824, then V2 is operated. Switch 822, on the other hand, determines whether the valves V1 and V2 are operated by the programmer or manually. Manual operation is obtained when switch 822 is on contact 825, and the program operation of the valves is obtained when switch 822 is on contact 826. Contact 826 is connected in series with the normally open contacts R9A of relay R9 which is connected in series with the silicon controlled rectifier 830. Rectifier 830 is a part of the photo-electric cell circuit which is described below.

Proceeding now with the description of the connections and operation of the photo-electric cell circuits, they begin with a step-down transformer 829, the secondary of which is connected across a full wave rectifier 832 which supplies a 24 volt direct current voltage to busses 833 and 834. The following circuits are connected across busses 833 and 834: the first circuit includes the photo-duo-diode 706 which is connected in series with relay R5. The next circuit includes the silicon controlled rectifier 830 and relay R9. The control electrode of diode 803 is connected to the circuit including the following elements: resistors 835 and 836, a push button switch 837, a resistor 838, contacts R2C and the spin switch 38. One may consider that resistor 835, push button switch 837 and resistor 836 are connected in series across busses 833 and 834 while the spin switch 38, resistor 838 and contacts R2C are connected in shunt with respect to the push button 837 and resistor 836. The next circuit includes a silicon controlled rectifier 841 which is connected across the busses in series with a resistor 842. A capacitor 844 is connected between conductors 845 and 846 interconnecting the two anodes of the silicon controlled rectifiers 840 and 841. The control element of the silicon controlled rectifier 841 is connected to the secondary 847 of a pulse transformer 848, the primary 849 of which is connected in series with the photo-controlled rectifier 705. The control element of rectifier 705 is connected in series with a resistor 850. The magnitude of resistor 850 determines the light sensitivity of rectifier 705 since resistor 850 is connected in series with the photo-voltaic cell of the rectifier. Resistor 851 is connected in series with the photo controlled silicon controlled rectifier 705. Resistor 851 cuts off this rectifier the very moment the light ceases to shine on rectifier 705. A capacitor 852 is connected across the primary 849 and rectifier 705. Capacitor 850 is charged and discharged with the aid of rectifier 705 in the manner which will be described below.

Figure 9:
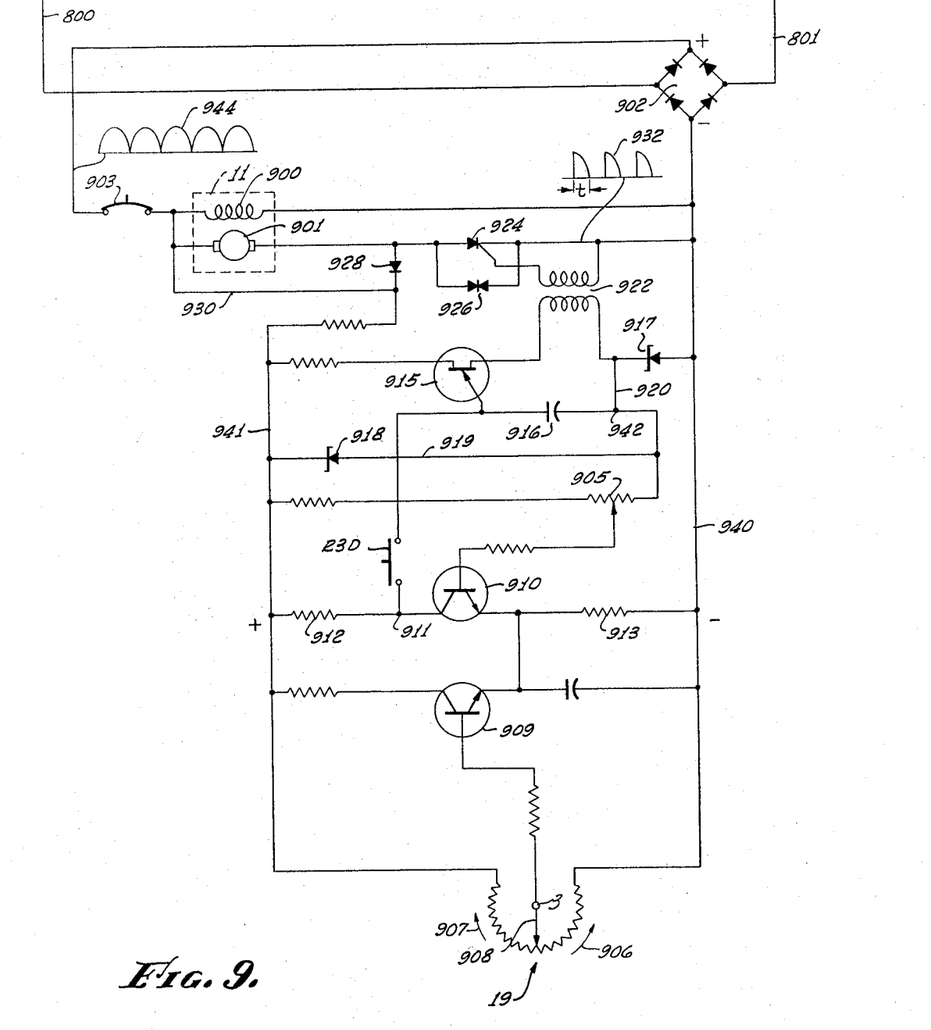
FIGURE 9 is the schematic diagram of the circuit for controlling the speed of the spin motor.

Before proceeding with the description of the operational cycle of FIG. 8, it is necessary to refer to FIG. 9 which illustrates a schematic diagram of the circuit used for controlling the speed of the spin motor 11 so as to make the speed of the tire casing 26, at the point of application of the ribbon 20 to the casing, equal to the speed of extrusion of ribbon 20 by extruder 13.

The programmer also controls the operation of the spin motor and, therefore, the control circuit of the spin motor is a part of the programmer.

Referring to FIG. 9, the spin motor 11 is a direct current motor having a field winding 900 and an armature 901, both of which are connected to the output side of a full wave rectifier 902 which is connected across alternating current busses 800 and 801 through an overload circuit protector 903. The field winding 900 is connected directly across the rectifier, and therefore, the current for the field winding is not controlled but is determined by the output of rectifier 902. The current through armature 901, however, is controlled by the potentiometer 19 and potentiometer 905. Potentiometer 19 is the potentiometer which is operated by the dancer roller arm 18 which supports the dancer roller 17 on the loop formed by ribbon 20 between the extruder die 16 and the idler roller 30. When the loop becomes large the potentiometer arm moves in the direction of an arrow 906, and when the loop becomes smaller, then the potentiometer arm 908 moves in the direction of an arrow 907, thus making transistor 909 less or more conductive, respectively, which in turn makes transistor 910 more or less conductive, respectively. Transistors 909 and 910 are connected to form a differential amplifier. The conductivity of transistor 910 determines the potential at a junction point 911, transistor 910 being connected in series with resistors 912 and 913, which in turn are connected across a direct current negative bus 940 and a positive bus 941. When the spin motor is in operation, relay R3 is energized, and therefore, contacts R3D are in closed position, with the result that the junction point 911 becomes connected to the emitter of unijunction transistor 915 and to the left side of a capacitor 916, as viewed in FIG. 9. The right side of capacitor 916 is connected to the zener diode 917 which is connected in series with the zener diode 918 with the aid of conductors 919 and 920. The unijunction transistor 915 is connected to a pulse transformer 922, the secondary of which is connected to the gate of a silicon controlled rectifier 924. Rectifier 924 is shunted by means of transient suppressor 926. A diode 928 is a commutating diode which is connected across the armature 901 by a conductor 930.

The operation of the speed control circuit is as follows: transistors 909 and 910 are operated as a differential amplifier with potentiometer 905 being manually set for adjusting the range of the operation of the potentiometer 19. The variable potential appearing at the junction point 911 depends on the position of the potentiometer arm 908 on the potentiometer 19 which in turn depends on the size of the loop formed by ribbon 20. The potential at point 911 determines the magnitude of the potential that is available for charging capacitor 916, and, therefore, determines the time constant of the CR circuit including capacitor 916, resistor 912 and zener diode 917. The two zener diodes 917 and 918 are connected in series directly across busses 940 and 941 and, therefore, act as a constant reference voltage for point 942 to which the right plate of capacitor 916 is connected. When capacitor 916 reaches the potential equal to that of the emitter in transistor 915, transistor 915 becomes conductive, discharging capacitor 916 and delivering a pulse through the pulse transformer 922 on the control electrode of silicon controlled rectifier 924, making it conductive. It is the rectifier 924 that controls the current flowing through armature 901. Only a portion of each half-cycle rectified voltage wave 944 can produce current through armature 901, i.e., only when rectifier 924 is made conductive by the pulse from transformer 922. The resulting wave is of the shape illustrated at 932 with only a portion of one-half cycle flowing through the armature 901 of motor 11. Potentiometer 19, therefore, controls the magnitude of the current flowing through the armature 901 by controlling the phase of that instant at which unijunction transistor 915 and rectifier 924 becomes conductive, which in turn controls the time duration T of the wave form 932. When loop 20 becomes excessively large, current 932 decreases, and when loop 20 becomes progressively smaller, current 932 increases, thus either increasing or decreasing the speed of the direct current motor 11 as a function of the rate of extrusion of ribbon 20 by extruder 13.

Referring now to the description of the functional cycle of the programmer illustrated in FIG. 8, in a general way, the first step that is performed is the placing of the wheel in the right spin and azimuth positions. The starting spin position is obtained by manually rotating wheel 8 and casing 26 until spin switch 39 is closed by cam 39a mounted on wheel 8 which energizes the amber light 808. It is necessary to place casing 26 and wheel 8 into the starting spin positions because it places casing 26 in the right starting position with respect to the spin switch 38 which controls the operation of the programmer in the manner which will be described more in detail below. Spin switch 39, therefore, is used for the sole purpose of positioning the casing in the proper "starting spin position" while the second spin switch 38 continuously controls the operation of the programmer during each spin revolution by starting the azimuth movement upon closing of the spin switch 38. Since the disclosed system is the so-called start-stop system, and the thickness of the deposited layer depends on the amount of the lateral displacement of the ribbon, and the degree of overlap between adjacent turns of the ribbon, it follows that the simplest way of timing the duration of the azimuth movement is by starting the azimuth movement at a predetermined spin position of the wheel by using a micro-switch actuated by a cam, i.e., switch 38 and cam 38a.

Momentary closing of spin switch 38, therefore, energizes the first set of circuits which produces the azimuth rotation or relative movement between the ribbon and the casing. This azimuth movement then continues, without any interruption, as long as the first set of circuits remains energized until a perforation is encountered on the upper level of tape 75, as viewed in FIG. 10, i.e., one of the perforations 76, 77, 78 . . . 79. When one of these perforations is encountered by the tape reader, then the second set of circuits in the programmer becomes energized, which de-energizes the first set of circuits, thus terminating the azimuth movement. All of the above takes place during each spin revolution, and, therefore, the cycle of operation during each spin revolution is as follows: at the predetermined point of the spin position, cam 38a energizes spin switch 38 which immediately starts the azimuth movement. This azimuth movement continues as long as solenoid-operated valve V1 remains energized, which means that the actuator 54 is energized and produces azimuth movement. After the scanning light 707 encounters one of the outer perforations 76 . . . 79, the solenoid-operated valve V1 becomes de-energized and, therefore, the actuator 54 becomes de-energized and azimuth movement stops. Therefore, summarizing the above, the spin switch 38 starts the azimuth movement and the perforations on tape 75 stop the azimuth movement. The duration of the azimuth movement is determined by the spacing between adjacent perforations, and this spacing also determines the thickness of the deposited layer.

The system is so arranged that there is substantially a 360° turn produced at the beginning of the winding cycle without any azimuth movement and an identical turn is produced at the end of the winding cycle. Therefore, the first and the last turns are produced without any azimuth movement, and accordingly, these turns lie in two parallel planes, both planes being perpendicular to the spin axis 37 and being spaced from each other by the total width of the winding or the total width of the variable thickness layer deposited on the casing. This is illustrated by the beauty rings 1502 and 1503 in FIG. 15.

Proceeding now with a more detailed description of the functional cycle of the programmer shown in FIGS. 8 and 9, and beginning this cycle after the first step, i.e., positioning of casing 26 into the starting spin position has already been accomplished by manually rotating casing 26 until spin switch 39 closes and the amber light 808 is lighted, the next step is to place the casing in the right azimuth position which is accomplished by first rotating the azimuth column beyond all the perforations on tape 75. Push button 837 is manually closed which makes silicon controlled rectifier 830 conductive, which energizes relay R9. Relay R9 is connected in series with the normally closed contacts R5B and silicon controlled rectifier 830. Relay R9, when energized, closes contacts R9A, which are in series with the two manually operated switches 822 and 821. Switch 822 now has been placed manually on contact 826 for obtaining automatic operation of the hydraulic actuator 54, and switch 821 is on contact 823, with the result that the solenoid operated valve V1 becomes energized which energizes actuator 54 so as to turn the azimuth shaft 40 in the direction of the first perforation 76 on tape 75. When the first perforation 76 on tape 75 is reached, photo controlled silicon controlled rectifier 705 becomes conductive, discharging capacitor 852 through a pulse transformer 848, which in turn makes silicon controlled rectifier 841 conductive, with the result that capacitor 844 becomes discharged through the silicon controlled rectifier 830, thus de-energizing relay R9 by making the reverse capacitor discharge current equal to the current flowing through relay R9. De-energization of relay R9 opens contacts R9A, with the result that solenoid operated valve V1 becomes de-energized and actuator 54 comes to rest while light still shines on the first hole, or perforation, 76 on tape 75.

The next step is starting of the extruder and of the programmer by depressing the extruder push button 812 and the programmer push button 807. Before depressing push button 807 the extruder is operated for the desired length of time until a ribbon of proper texture, consistency and shape is obtained. After a smooth ribbon, free of any wavy deformations, is extruded, push button 807 is closed which starts the programmer. The ribbon is then simultaneously and quickly threaded under the dancer roller 17, idler roller 30, spin wheel 23 and casing 26, whereupon column 7 is manually swung over, by means of the lever arm 80 and its knob 104, toward casing 26 which stitches the ribbon to the casing. This starts the ribbon winding cycle.

It should be noted that the spin wheel 23 now is in operation because the spin motor 11 becomes energized the very moment push button 812 is closed, i.e., the spin motor becomes energized at the same time the extruder motor becomes energized. This is accomplished by relay R3 which has its contacts R3D connected in the control circuit, FIG. 9, on the spin motor 11. Closing of contacts R3D immediately starts the spin motor.

Figure 10:
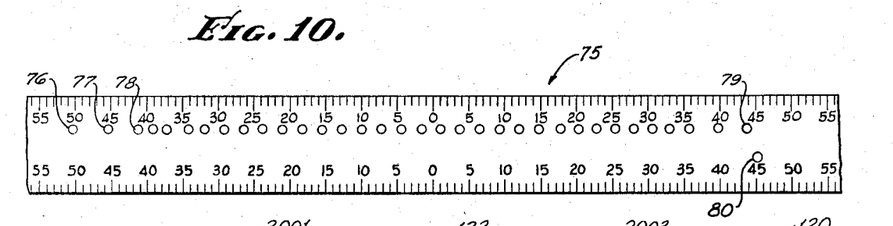
FIGURE 10 is a plan view of a punched tape.

Closing of push button 807 energizes relay R2 which closes contacts R2A, R2B and R2C. Contacts R2A are the relay locking contacts which are connected in series with contacts R3C. Contacts R3C are now also closed because of the prior energization of relay R3. Contacts R2B place the elapsed time indicator 816 into operation and contacts R2C connect resistor 838, spin switch 38, resistor 835 and the control electrode of rectifier 830 to bus 834. There is no azimuth movement at this time because relay R9 at this time is de-energized, and therefore, casing 26 is turned approximately 360° without any azimuth movement until a substantially full turn of ribbon 20 is wound on casing 26 in a single vertical plane perpendicular to the spin axis 37. This corresponds to the beauty ring 1502. This is the starting turn of the winding wound on casing 26. There is no azimuth movement during this substantially full turn because the spin switch 38 is in an open position at this time because of the prior rotation of casing 26 from the position at which the spin switch 38 has been closed. The spin switches 39 and 38 and their cams 39a and 38a are so mounted on the azimuth column 44 and wheel 8, respectively, that the operation of spin switch 38 lags slightly the operation of spin switch 39. In this manner, a substantially 360° turn is obtained without any azimuth rotation. When spin switch 38 becomes closed, it impresses the desired control potential on the control electrode of silicon controlled rectifier 830, with the result that rectifier 830 becomes and remains conductive, thus energizing relay R9. Rectifier 830 remains conductive until the next perforation on tape 75 makes the photo-controlled rectifier 705 conductive, as described below. Relay R9 again closes contacts R9A which produces energization of the solenoid-operated valve V1, with the result that the azimuth movement again is resumed and continues until the photo controlled silicon controlled rectifier 705 becomes conductive and discharges capacitor 852 after the tape reader 96 encounters the next perforation and light 707 makes the photo-controlled rectifier 705 conductive. Capacitor 852 discharges through rectifier 705 and primary 849 which makes diode 841 conductive. This, as described earlier, makes silicon controlled rectifier 830 non-conductive, because of the discharge of capacitor 844 through SCR 830, thus de-energizing relay R9 and stopping the azimuth movement. This cycle of operation continues until perforation 80 is reached on tape 75 which energizes photo-duo-diode 706. This energizes relay R5 and relay R5 opens the normally closed contacts R5A which are connected in series with the locking circuit of relay R3, thus de-energizing relay R3. De-energization of relay R3 opens contacts R3C which in turn de-energize relay R2, thus stopping the entire machine, including spin motor 21 which becomes de-energized because of the opening of contacts R3D. Therefore, the entire machine comes to rest.

It has been mentioned previously that there is no azimuth movement when the first and the last turns are being wound. Insofar as the first turn is concerned, the No-azimuth movement operation for substantially 360° is obtained by positioning the spin switches 38 and 39 and their cams 38a and 39a so that the spin switch 38 is closed first and the spin switch 39 is closed second. Therefore, at the starting point when the proper starting spin position is obtained, the spin switch 39 is closed, which means that the spin switch 38 is open and, therefore, no azimuth movement takes place upon energization of the programmer when push button 87 becomes energized. The azimuth movement then begins upon closing of spin switch 38 a few degrees prior to the completion of the entire 360° turn, but this azimuth movement, if so desired, can be stopped almost instantly by positioning the first tape perforation 76 so that this azimuth movement stops almost immediately after the closing of spin switch 38. It is in this manner that it is also possible to deposit a number of substantially superimposed turns, such as three superimposed turns illustrated at 1502 and 1503 in FIG. 15, which are the two beauty rings.

As to the last turn, the above discussion also applies to the last turn except that in this case the azimuth movement is stopped not by the last perforation 79, but by the last perforation 80, which is positioned so as to produce closing of the 360° turn only a few degrees of the circumferential section after the resumption of the azimuth movement.

FIGURES 7 and 8 disclose a programmer in which the tape is "read" or scanned, by means of two light sources and two photo-electric light sensitive elements 706 and 705. It is also possible to replace these elements with the micro-switches of the type disclosed in FIGS. 11 and 12 at 1100 and 1101. The micro-switch 1100 is located on a different level from micro-switch 1101, with the result that micro-switch 1100 reads only the machine stopping perforation 80 while micro-switch 1101 reads all other perforations on the lower level of tape 75, beginning with perforation 76 and ending with perforation 79. Micro-switches of this type are well known in the art and need no additional description.

FIGURE 12 illustrates the cross-sectional view of the block elements 1200, 1201 and 1202 supporting the two micro-switches 1100 and 1101. Switch 1100 is provided with a ball 1204 which drops into the perforation of tape 75 whenever such perforation aligns itself with the ball 1204, thus actuating the switch. Swith 1101 operates in the same manner.

Figure 13:
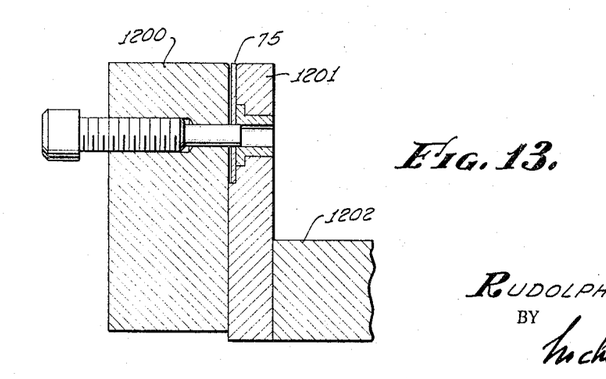
FIGURE 13 is a transverse vertical section of a tape puncher.

FIGURE 13 illustrates a punch 1300 which is used for perforating the tape.

FIGURE 14 illustrates that portion of the programmer which is connected to the output of rectifier 832 corresponding to the similarly numbered rectifier in FIG. 8, solenoid operated valves V1 and V2 and an additional relay R6 which is used instead of the electronic components shown in the lower part of FIG. 8, i.e., components connected to D.C. busses 833 and 834. The only difference between what is shown in FIG. 8 and what is shown in FIG. 14 is that the light sensitive elements 706 and 705 now have been replaced with the microswitches 1100 and 1101.

The operation of the programmer illustrated in FIG. 13 is in every respect identical to that illustrated in FIG. 8, with the exception that while in FIG. 8 the photo-controlled rectifier 705 and photo-duo-diode 706 are used in scanning tape 75, in FIG. 13 it is micro-switches 1101 and 100. Switch 1100 performs the same function as photo-duo-diode 706 while switch 1101 performs the same function as the photo-controlled silicon-controlled rectifier 705. Capacitor 1402 now is used for producing a relay energization pulse for momentarily energizing relay R9 when the tape reading switch 1101 is on contact 1403. When switch 1101 is on contact 1404, it short-circuits capacitor 1092, thus making the initial charge equal to zero for insuring proper operation of relay R9 every time switch 1101 is transferred to contact 1403.

Proceeding with the description of the functional cycle of the programmer shown in FIG. 14, which should be read with the aid of FIGS. 8 and 14, upon positioning of the azimuth arm 7 beyond the first perforation 76, push button 837, FIG. 14, is depressed which energizes relay R6 and relay R6 locks itself over the normally closed contacts R9A, R5B and now closes contacts R6A. Energization of relay R6 closes contacts R6B, FIG. 14, which energizes solenoid operated valve V1, with the result that the actuator 54 advances tape 75 until the first perforation 76 is encountered, whereupon the tape reading micro-switch 1101 now transfers its armature from contact 1404 to contact 1403, with the result that relay R9 is momentarily energized because of the charging current flowing into capacitor 1402, whereupon contacts R9A open, with the result that relay R6 de-energizes and contacts R6A and R6B become open. The solenoid-operated valve V1 becomes de-energized and the azimuth motion stops. The above operation places the azimuth column in the proper azimuth starting position. The proper spin position is obtained by rotating casing 26 until switch 39, FIG. 8, is closed, thus energizing amber light 808, FIG. 8. The extruder is started by closing switch 814 and push button 812, FIG. 8. Energization of the extruder starts the spin motor because of closing of contacts R3D. After a smooth ribbon has been obtained, the spin wheel arm 7 is manually swung toward casing 26 and simultaneously push button 807 is energized which places the entire machine into operation.

Near the end of the first turn, the spin switch 38, FIG. 14, closes, with the result that relay R6 is energized through the spin switch and the now closed contacts R2C. Relay R6 again locks itself through the locking circuit including contacts R9A, R5B and R6A, and it remains in locked position until the next perforation is reached by the switch 1101, whereupon relay R9 is energized, opening contacts R9A, with the result that the azimuth movement stops and it is resumed again after the spin switch 38 becomes closed again at the end of the next revolution. This cycle is continued until micro-switch 1100 opens relay R5 upon encountering the last perforation 80, and energization of relay R5 stops the operation of the entire machine because of the opening of contacts R5A which de-energizes relay R3 because of the opening of contacts R5A. De-energization of relay R3, FIG. 8, de-energizes relay R2 because of the opening of contacts R3C and simultaneously R6 is de-energized because of the opening of contacts R5B, if the actuator 54 happened to be in motion at that instant. The above method of operation of relay R6 insures the fact that the very last turn deposited on the casing without any azimuth movement is at least closed upon itself since R6 becomes open immediately after the completion of the 360° turn.

In the light of the description of the programmers, whether they are controlled by the light sensitive elements or micro-switches, the azimuth movement is initiated upon the momentary closing of the circuits controlled by the spin switch 38, which produces the first electrical signal used for initiating the azimuth movement, and this azimuth movement continues until the last perforation is reached, whereupon a second electrical signal is generated which stops the azimuth movement. The azimuth movement takes place during only a fraction of the 360° spin revolution. As mentioned previously, it is preferable to have a reasonably large sector spanned by the arc corresponding to the azimuth movement, such as an arc from, say, 60° to 120°, so as to avoid a sudden change in the position of the ribbon when the azimuth movement is introduced and is combined with the spin of the casing around its spin axis.

The disclosed system, therefore, is a start-stop system insofar as the azimuth movement is concerned. The azimuth movement is started when one of the spin switches, which is spin switch 38, momentarily closes its circuit and produces the first electrical signal. This azimuth movement is then continued for that portion of the revolution and that length of time, or duration, which is determined by the spacing between the preceding and the succeeding perforations on tape 75. The larger is the spacing between the adjacent perforations, the longer is the duration of the azimuth movement and vice versa.

The first electrical signal normally produced by the spin switch 38 can also be produced manually by momentarily closing the manually operated push button switch 837. This push button is used only for positioning the casing into the right proper starting azimuth position. This is accomplished by producing the first electrical signal, as mentioned above, by closing push button 837 which starts the azimuth movement. This azimuth movement then is continued until the first perforation 76 is reached on tape 75, which then generates the second electrical signal and the second electrical signal is used for terminating the azimuth movement.

Before concluding the description of the machine, it should be noted here that perforations 76 through 79 and 80 are punched on the tape by using charts and tables containing the necessary information for different tire sizes and different matrices.

FIGURE 18 discloses that type of layer which is generally deposited on truck tires. It is restricted to the tread portion of the tire and does not extend to the sidewalls. It is known in and called by the industry as a "recap." Such layer can be deposited using the disclosed programmers in the same manner as the layer illustrated in FIGS. 15, 16 and 17 except that the spacing of the perforations on tape 75 is adjusted so as to produce layer 1800. The crown and the second shoulder portion of the layer will call for a substantially uniform spacing of the perforations since there is no difference in the thickness of the deposited layer. The first shoulder will require some adjustment of the spacing between the perforations, with the first turn 1802 having no azimuth movement at all and only a very limited movement thereafter for several additional turns. Once the desired thickness has been reached, the spacings between the perforations become uniformly spaced from each other.

In FIG. 19 the first layer, including sidewall portions 1904, 1904a and 1910 and 1910a, are deposited in the same manner as the sidewall sectors illusrtated in FIGS. 15, 16 and 17, with the first and the last turns having no azimuth movement. The two beauty rings 1907 and 1908 are obtained by making three perforations on tape 75 very close to the position on the tape corresponding to line 1600 in FIG. 17, which is the line indicating the time of closing of the spin switch 38. Since, in this case, it is necessary to stop the azimuth movement almost immediately after it starts (ideally, there should be no azimuth movement at all), the tape perforations should terminate this azimuth movement with hardly any percepible azimuth movement taking place; and since three turns are used for making the beauty rings 1907 and 1908, three perforations of this type will be necessary on tape 75. The remaining portion of the layer, such as the remaining portions of the sidewalls 1904a and 1910a, are deposited in the same manner as portions 1904 and 1910. As to the portion 1912, it corresponds to the shoulder and crown sectors described previously in connection with FIGS. 15, 16 and 17 and, therefore, they need no additional description.

In order to deposit the second layer 1909, it will be necessary to repeat the entire program cycle, this time using a second tape which has its perforations spaced so as to produce layer 1909. It is to be understood that the wheel must be returned to its position indicated by line 1914 in FIG. 19, which corresponds, in function only, rather than the position, to the perforation 76 on tape 75, i.e., it corresponds to the "azimuth starting position" at which time amber light 808 will be lighted in the manner described previously.

Figure 20:
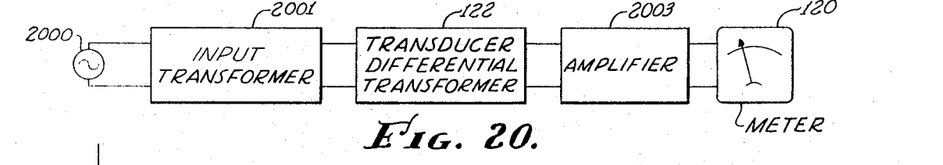
FIGURE 20 is a block diagram for a transducer used for measuring the thickness of the elastomeric ribbon.

It has been mentioned in the introductory part of the specification that the disclosed machine is provided with transducer 122 and meter 120 for continuously indicating the thickness of the extruded ribbon 20. Transducers of this type are well known in the art and they, generally, represent a differential transformer which is connected to an amplifier and then the output of the amplifier is connected to a meter. The block diagram of the circuit for transducer 122 and meter 120 is illustrated in FIG. 20. A source of alternating current 2000 is connected to an input transformer 2001 which impresses a proper alternating potential on the primary of the differential transformer 122, which is the transducer. The two differential windings on the secondary side of transducer 122 are connected to an alternating current amplifier 2003 and the output of the latter is connected to a direct current meter 120 which continuously indicates the thickness of the ribbon. This meter is mounted on panel 15, FIG. 1. If there is any marked change in the thickness of the ribbon, the operator adjusts the opening of die 16 by means of a set screw 121 to produce the desired thickness. In this manner, the thickness of the deposited variable thickness elastomeric layer illustrated in FIGS. 15–18 is made of the desired thickness as long as the operator continuously monitors the thickness of the ribbon with the aid of meter 120. In my earlier application, Serial number 196,542 (now Patent No. 3,251,722 issued May 17, 1966), the above is accomplished automatically with the aid of the feed-back or compensating electronic circuits of the completely electronic programmer.

What I claim is:

1. A machine for winding an elastomeric ribbon for producing an external elastomeric layer on a tire casing, said machine including stationary feed means for the ribbon, a rotatable azimuth shaft, an azimuth column fixed to said azimuth shaft for transverse movement relative to the feed means, a wheel rotatively mounted on said column and having the tire casing mounted thereon to wind said ribbon on the casing, drive means for rotating said azimuth shaft and said azimuth column to space the respective windings of the ribbon on the tire casing, and a programmer for controlling the operation of said drive means, said programmer including a perforated tape having a plurality of perforations located along the length of said tape to determine the winding program, means for moving said tape along its length driven by and synchronized with said azimuth shaft, means for sensing said perforations, a spin switch mounted on the azimuth column and a cam mounted on the wheel for operating said spin switch during each revolution of said wheel, a first relay means energized upon momentary closure of said spin switch by said cam during the rotation of said wheel, said first relay means energizing said drive means to rotate said azimuth shaft and said azimuth column upon momentary closing of said spin switch by said cam to produce a predetermined winding pattern on the casing, and a second relay means controlled by the programmer, said second relay means de-energizing said first relay means and said drive means upon encounter of predetermined perforations on said tape by said sensing means.

2. In a ribbon winding machine, a programmer for controlling a periodic transverse movement of a tire carcass upon which an elastomeric ribbon is to be wound, said programmer including a spin motor for spinning said tire carcass around a spin axis of said carcass, means for producing a relative transverse movement between said ribbon and said member in the direction of said spin axis, a control tape having a plurality of perforations to determine the winding program, the spacing between adjacent perforations corresponding to the desired duration of said relative movement during each spin revolution of said member, and the tape being moved along its length in synchronization with and driven by the means for producing transverse movement, means for scanning said tape and said perforations when said tape is moved therealong and producing signals corresponding to the programmed perforations and, means for generating a signal upon completion of each revolution by the tire carcass around said spin axis, to activate the means for producing a relative transverse movement, said movement being controlled by the tape signals.

3. In an apparatus for applying an elastomeric ribbon to a tire casing, a programmer for controlling a transverse relative movement between a member supporting a tire casing and an elastomeric ribbon to be wound on said casing, said programmer comprising a spin motor for spinning said member around its spin axis, means producing a first electrical signal upon completion of each revolution of said casing around said spin axis, means for producing said relative movement between said casing and said ribbon, said means starting said relative movement in response to said first electrical signal, a tape having a plurality of sequential perforations along the length of said tape spaced to correspond to a predetermined program, means for moving said tape in synchronization with and driven by the means for producing relative movement, means for scanning said tape during its movement and generating a second electrical signal in response to the scanning of each perforation on said tape, and electromechanical means coupling the scanning means to the means for producing relative movement to terminate the relative movement in response to said second electrical signal.

4. A machine for winding an elastomeric ribbon along the outer surface of a tire casing, said machine comprising feed means for the ribbon, a frame, an azimuth shaft rotatively supported by said frame, an azimuth column mounted on and rotatable with said shaft for transverse movement relative to the feed means, a wheel rotatively mounted on said azimuth column, said casing being mounted on said wheel, a spin motor for rotating said wheel and said casing about a common spin axis, a first pulley keyed to said azimuth shaft for imparting rotational movement thereto, a second idler pulley rotatively supported by said frame, fluid operated drive means mounted on said frame and coupled to said first and second pulleys to drive said pulleys, means for controlling the operation of said drive means, and a programmer for operating said drive means by energizing and de-energizing said controlling means, said programmer having first and second means for generating first and second electrical signals, respectively, during each spin revolution of said casing around said spin axis, said first and second means energizing and de-energizing said fluid operated drive means in response to said first and second signals, respectively, to rotate said azimuth shaft with the aid of said drive means a predetermined, controllable amount during each spin revolution of said casing in accordance with a predetermined program.

5. A machine for winding an elastomeric ribbon along the outer surface of a tire casing in accordance with claim 4 wherein the means for controlling the operation of said fluid operated drive means comprises valve means connected to said drive means and electrically operated solenoid means coupled to the signal generating means for energizing and de-energizing said valve means in accordance with a predetermined program signal received from the programmer.

6. A machine for winding an elastomeric ribbon on a tire casing, said machine comprising means for feeding the ribbon to the tire casing, means for rotatively supporting said tire casing, means for rotating said supporting means and said tire casing about their common spin axis, means for producing a transverse displacement between said tire casing and said elastomeric ribbon as the ribbon is fed thereto, and a programmer controlling the duration of said transverse displacement, said programmer including a first signal generator generating a first electrical signal at a predetermined angular position of said member with respect to a fixed reference point during each revolution of said member about said spin axis to initiate said transverse displacement, and a second electrical signal generator actuated by the predetermined amount of said transverse movement of said member, said second generator generating a second electrical signal during each spin revolution of said member to terminate said transverse movement.

7. The machine as defined in claim 6 in which said first signal generator comprises a switch momentarily closed during each revolution of said casing around said spin axis, said switch generating said first electrical signal, and said second electrical signal generator comprises a mechanical indicia means having a plurality of indicia thereon, means coupling said indicia means to the means for producing a transverse displacement of the member for moving said indicia means in response to said transverse displacement, and electrical scanning means for scanning said indicia means and generating said second signal upon encountering each indicia on said indicia means.

References Cited by the Examiner

UNITED STATES PATENTS

| Re. 25,349 | 3/1963 | Hanson | 156—130 |
| 1,335,879 | 4/1920 | Darrow | 156—130 |
| 2,518,967 | 8/1950 | Witt | 156—397 |
| 2,555,343 | 6/1951 | Jones | 156—367 |
| 3,117,047 | 1/1964 | Capistrant et al. | 156—410 |
| 3,177,918 | 4/1965 | Holman | 156—130 X |

FOREIGN PATENTS 1,159,653  2/1958  France.

EARL M. BERGERT, *Primary Examiner.*
CLIFTON B. COSBY, *Examiner.*